United States Patent [19]

Wendling et al.

[11] Patent Number: 5,321,818
[45] Date of Patent: Jun. 14, 1994

[54] SYSTEM FOR ARBITRATING FOR ACCESS ON VME BUS STRUCTURES

[75] Inventors: Daniel R. Wendling, Darnestown; Michael J. Giovannoni, Beltsville, both of Md.

[73] Assignee: Hughes Aircraft Company, Los Angeles, Calif.

[21] Appl. No.: 881,940

[22] Filed: May 12, 1992

[51] Int. Cl.$^5$ ............................................. G06F 13/37
[52] U.S. Cl. .............................. 395/325; 364/DIG. 1; 364/229.2; 364/230.4; 364/240.4; 364/242.8; 364/242.92
[58] Field of Search ................................ 395/325, 725

[56] References Cited

U.S. PATENT DOCUMENTS

| | | | |
|---|---|---|---|
| 4,484,273 | 11/1984 | Stiffler et al. | 395/325 |
| 4,633,394 | 12/1986 | Georgiou et al. | 395/650 |
| 4,785,394 | 11/1988 | Fischer | 395/325 |
| 4,897,833 | 1/1990 | Kent et al. | 370/85.2 |
| 5,083,259 | 1/1992 | Maresh et al. | 395/325 |
| 5,175,825 | 12/1992 | Starr | 395/325 |
| 5,263,163 | 11/1993 | Holt et al. | 395/725 |

OTHER PUBLICATIONS

*Design of Multiprocessor Buses* by Del Corso et al, Chapters 4 and 5, pp. 117–205 (note in particular pp. 138–143).

Primary Examiner—Debra A. Chun
Attorney, Agent, or Firm—Gordon R. Lindeen, III; William J. Streeter; Wanda K. Denson-Low

[57] ABSTRACT

System for providing self-selection arbitration among a plurality of slave processors connected to a VME back plane. The slave processors are connected to a common ID bus, interrupt line, and acknowledge bus. Slave processors contend for access to the VME back plane by asserting an interrupt level unique to a group of slave processors on the interrupt line. Simultaneously, the contending slave processors apply their respective addresses to the ID bus. When a contending slave processor receives an acknowledge over the acknowledge bus from a master processor, and senses its own address on the ID bus, it has successfully won the right to transmit data over the data bus.

11 Claims, 3 Drawing Sheets

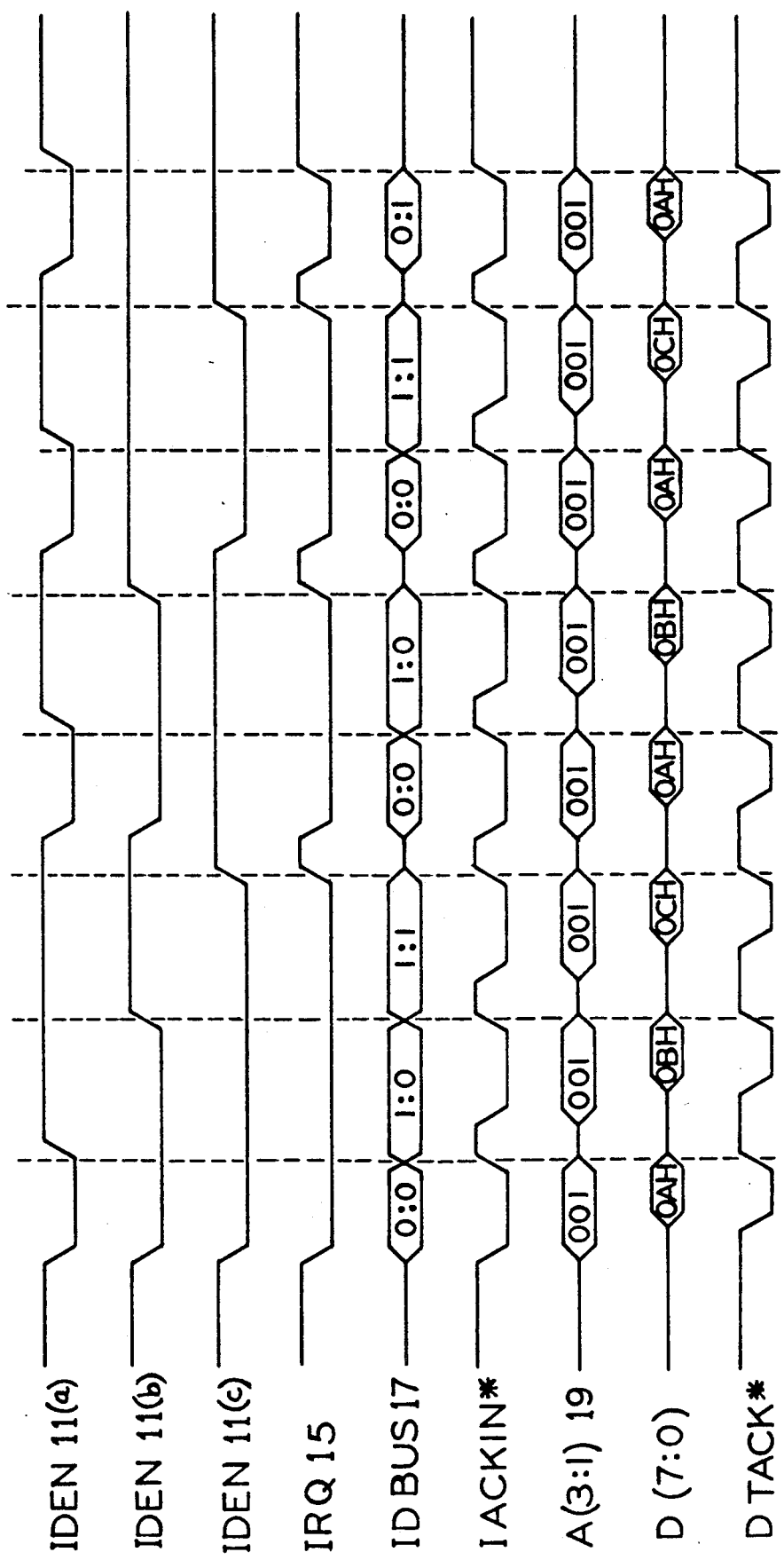
FIG._2

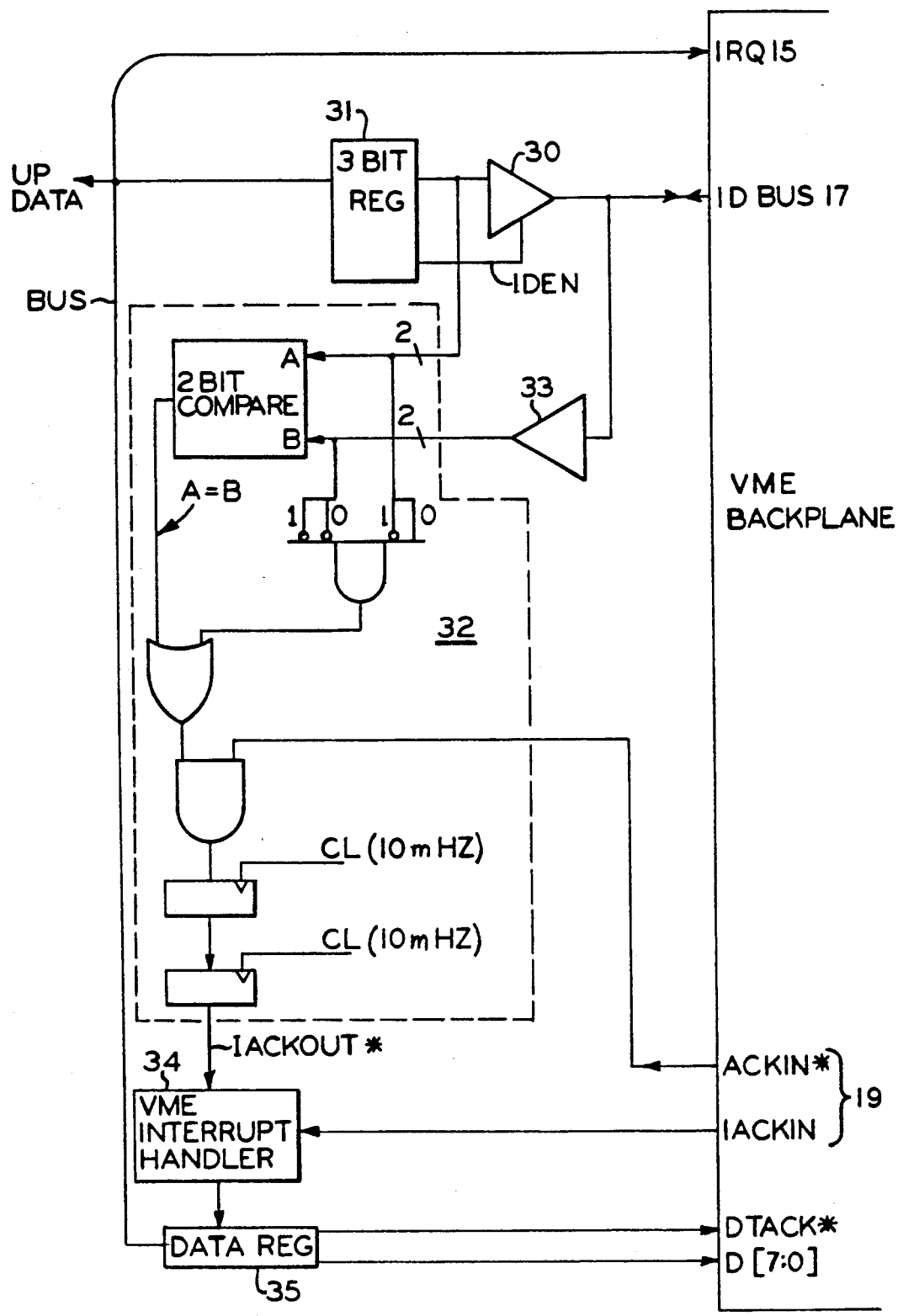
FIG_3

SYSTEM FOR ARBITRATING FOR ACCESS ON VME BUS STRUCTURES

The present invention relates to microprocessors which communicate over a common bus. Specifically, processors are arranged to communicate in a VME bus environment. The interconnected processors have a distributed arbitration system such that individual processors may be removed from the bus without interference to the operation of the remaining processors connected to the VME back plane bus.

The VME bus standard was developed in 1981 by MOSTEK, Motorola and Signetics/Philips to support the interconnection of 16 and 32 bit microcomputers. The system included a back plane which interconnected a plurality of processors. Certain processors would serve as slave processors communicating with a master processor over the back plane bus structure. The system permitted more than one master to be supported on the same bus. It also permitted multiple interrupt handlers which service interrupts from multiple interrupters. Arbitration between multiple interrupters (slaves) to gain the attention of the interrupt handler (master) was through a multi-level daisy chain protocol. Each processor board connected to the back plane is provided with an IACKIN (Interrupt Acknowledge In) and IACKOUT (Interrupt Acknowledge Out) connection. In the normal wait condition, the IACKIN and IACKOUT ports are logically connected together through the processor. A processor wishing access to the bus will interrupt the logical connection and present an interrupt level on an interrupt line of the VME bus. The active interrupt will signal the master processor to issue an ACKNOWLEDGE which is detected by the requesting processor. When the ACKNOWLEDGE is received by the requesting processor, it is not propagated to the next adjacent processor as the normal logical connection between IACKIN and IACKOUT is disrupted. At this time, the processor board requesting access through the back plane bus detects the acknowledgement as a grant to use the bus. The requesting processor board then vectors its data on appropriate data lines of the back plane bus.

Although widely used, the VME bus structure of IACKIN to IACKOUT daisy chain protocol has some significant disadvantages. This protocol only works when all boards are present in the back plane. In the event that a board might be removed for service or other reasons, the entire system becomes inoperative. Therefore, the devices cannot function as hot repairable devices.

Systems which use a distributed self-selection arbiter are described in chapter 4 of the text *Multi-Microprocessor Systems for Real Time Applications*, by Conte and D. Delcorso (1985), pages 138-143. These systems permit each individual bus-connected processor to initiate arbitration with a master unit. The individual units have a priority ranking among themselves, permitting access to be granted to the highest priority module contending for access to the bus. Systems such as described in the foregoing reference avoid the disadvantages of a daisy chain-type protocol, wherein the removal of a module interferes with the operation of the remaining modules connected to the bus back plane.

SUMMARY OF THE INVENTION

It is an object of this invention to provide for a self-selection arbitration system for processors connected to a VME back plane.

It is a further object of this invention to provide for a master processor which can communicate through a VME back plane with individual groups of slave processors connected to the back plane.

These and other objects are provided by a system of processors connected over a VME back plane structure. The system connects a first plurality of slave processors to a common ID bus, as well as a first common interrupt bus and an IACK bus. A second group of slave processors are interconnected over a second common ID bus, and a second common interrupt bus and the single IACK bus which is connected to the first group.

A master processor connected to the bus structure distinguishes between first and second groups of slave processors by monitoring the interrupt levels appearing on the interrupt bus. When one slave processor of a group initiates an interrupt, its level is detected on the interrupt bus by the master processor. The master processor will authorize the requesting slave processor by transmitting an encoded ACKNOWLEDGE over the acknowledge bus unique to the group of slave processors belonging to the interrupt level being serviced.

Priority of access to the back plane bus is determined among the group of slave processors which may be contending for access to the bus at the same time by assigning addresses in accordance with the priority of each slave processor. When a processor has initiated an interrupt, it applies its own address to the ID bus. Upon receipt of an ACKNOWLEDGE, a processor which senses its own address on the ID bus has priority of access to the bus. The higher priority processors will have address bits which can overwrite the lower priority address bits. The winning processor sensing its own address on the ID bus will then initiate a data transfer over the data lines of the backplane bus.

DESCRIPTION OF THE FIGURES

FIG. 2 is a timing diagram illustrating how the slave processors obtain access to the master processor over the VME back plane bus structure.

FIG. 3 illustrates in greater detail the circuitry of a slave processor for conducting arbitration over a VME bus.

DESCRIPTION OF THE PREFERRED EMBODIMENT

Figure 1:
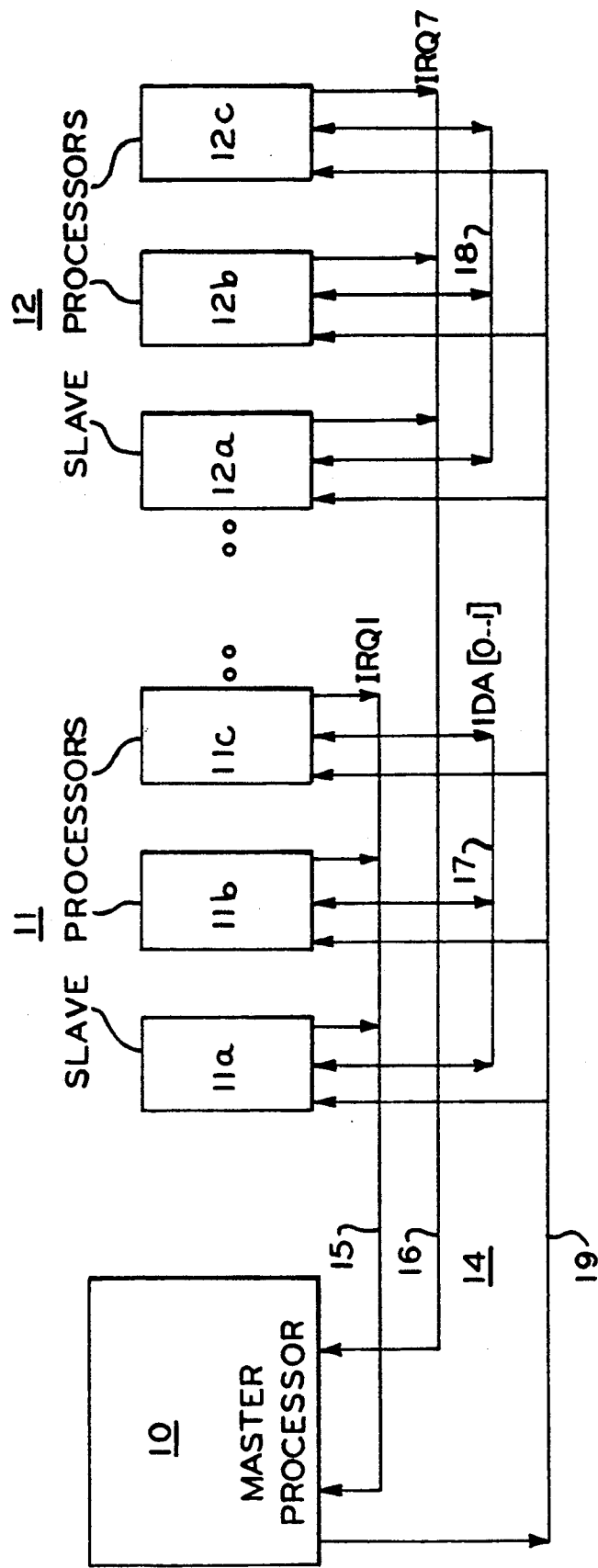
FIG. 1 illustrates a configuration of two groups of slave processors connected to a single master processor on a VME bus in accordance with one embodiment of the invention.

Referring now to FIG. 1, there is shown a configuration of a master processor 10 connected to two groups of slave processors 11 and 12. As will become apparent in the description of the preferred embodiment, more groups of three slave processors may be interfaced to the master processor 10. In the embodiment to be described, a group of three slave processors share an IRQ bus. The number of slave processors contained within a group is arbitrary so long as the associated ID bus is capable of distinguishing among the number of slave processors in a group. Accordingly, the description of use of three slave processors per group is merely exemplary and those skilled in the art will be able to apply the principles of the invention to systems with groups of more or less than three slave processors per group.

Each of the slave processors 11 and 12 are connected to the master processor 10 via a back plane bus 14. The back plane bus includes an address bus (not shown) and data bus (also not shown) in which each of the slave processors, once having successfully arbitrated for access to the back plane bus, may supply data to the master processor.

That portion of the back plane bus 14 which is employed during arbitration is shown as the interrupt bus (IRQ BUS) 15 and 16, an identification (ID) bus ID 17 and 18 and a common IACKIN acknowledge bus 19. The IRQ bus and IACKIN bus are all common to the VME back plane structure. However, as will be evident in a discussion of the operation of the arbitration system of the embodiment shown in FIG. 1, the bus lines perform a different function. The ID bus 17, 18 is added to the backplane structure.

Each group of slave processors 11 and 12 has its own unique IRQ bus 15 and 16. These IRQ lines are dedicated to a specific interrupt level, which will be recognized by the master processor 10, as a request by one or more of the slave processors 11a, 11b, 11c, 12a, 12b or 12c of a given group of slave units 11 and 12 for access to the back plane data bus.

Each of the requesting slave processors assert its two bit address on a respective ID bus 17 or 18. The master processor 10 will supply an encoded acknowledge signal on IACKIN bus 19 to all slave processors of the group of slave processors 11 and 12. The IACKIN bus 19 is composed of three VME address lines, A1 through A3, which encode the acknowledge level and a single IACKIN line indicating that an acknowledge cycle is occurring. Only one of the groups of slave processors corresponding to a group issuing the interrupt will recognize the acknowledge.

Thus, once an interrupt has been issued by one or more slave processors on its respective interrupt line, the master processor 10 will discriminate which group of slave processors has initiated the interrupt. An encoded IACKIN is sent back over the IACKIN bus 19 and is recognized by those units requesting access to the data and address buses. In accordance with a unique aspect of the preferred embodiment, each of the slave processors of a group 11a, 11b or 11c, or with respect to group 12, 12a, 12b or 12c, is assigned a two bit address. If two or more slave processors in a group are competing for access to the data bus, priority is awarded to the one who recognizes its own address on the ID bus. This results from the higher priority slave device having an address which can overwrite other, lesser priority slave device addresses which may also be contending for access to the data bus. Thus, the protocol is distributed among all connected slave processors. The removal of a slave processor therefore does not inhibit the remaining processors from contending for access to the back plane data bus.

As the master processor can discriminate among more than two levels of interrupts, more than two groups of slave processors may be serviced by a master processor 10. As there are normally up to seven interrupt levels available in a VME master processor, an additional five more groups of slave processors may be connected in accordance with the protocol shown in FIG. 1. These additional groups of slave processors initiate requests for access which are similarly processed by the master processor 10. The operation of the system shown in FIG. 1, when more than one slave processor of a group sharing a common interrupt level contends for access to the master 10, is illustrated in FIG. 2.

FIG. 2 is a timing diagram of the events which take place over the IRQ bus 15, ID bus 17 and IACKIN bus 19 of FIG. 1. The initiation of a request to transfer data over the data bus to the master processor 10 begins when the IRQ line constituting bus 15 goes low. This results when one or more of the three of the slave processors 11a, 11b or 11c drive their identity on the IDA bus 17, and assert an interrupt level on IRQ line 15. IDEN 1, IDEN 2 and IDEN 3 are enable lines on the respective slave processors which go low when an interrupt is to be generated.

In the following table, slave processor board 11a drives 01, slave processor board 11b drives 10 and slave processor board 11c drives 11 onto the open collector ID bus. A processor board wins arbitration when it sees its own ID on the shared ID lines. Processor board 11a also wins arbitration when 00 is on the ID lines, in addition to 01. This occurs when processor board 11a and 11b are contending as well as when all three processor boards are contending for access. The interrupt handler will supply an ACK on bus 19 encoded to identify that it has received the interrupt from a specific group of slave processors, and granting access to the highest priority slave processor within the group seeking access to the bus. An ACKIN* line is shown in a low logic level state. This single bit line is complementary to the IACKIN bus 19, and assumes the low state any time the master processor 10 is acknowledging an interrupt.

TABLE A

| Driving Device(s) | State of ID (Bus) | Interrupt ACKed By |
|---|---|---|
| 11a Only | 01 | 11a |
| 11b Only | 10 | 11b |
| 11c Only | 11 | 11c |
| 11a & 11b | 00 | 11a |
| 11a & 11c | 01 | 11a |
| 11b & 11c | 10 | 11b |
| 11a, 11b, 11c | 00 | 11a |

Each of the two bit address drivers for a given slave processor provides an open collector terminated to a "high" logic level on the back plane. If three processor boards are asserting their IDs simultaneously on the ID bus, both address lines will be at 00, representing two high logic levels. This state is assigned to grant access to processor board 11a and therefore it acquires the bus. As shown in FIG. 2, this results in the D(7:0) data bus being driven by the winning slave processor in synchronism with a data transfer acknowledge line DTACK*, which is driven by a clock signal generated by the winning slave processor.

FIG. 2 illustrates that once the lower order slave processor 11a has completed vectoring its data to the data bus D(7:0), the priority is then established between slave units 11b and 11c. Among these units, the lower order address of slave processor 11b will be recognized by processor 11b on the ID bus. Processor 11b will then have access to the bus, and then transfer its data over D(7:0). The DTACK* line will also be driven by the winning slave processor 11b. Finally, in accordance with Table A, the slave processor 11c will gain access to the bus when it sees its address, i.e., 2 logic low levels (11) on the data bus line. A data transfer will follow over D(7:0) and the data clock line DTACK* will be asserted by the slave processor 11c.

Thus, it can be seen that by establishing two bit identification numbers as binary 01, 10 and 11, wherein a 0 represents a high collector signal applied to the ID line, and a 1 represents a closure to ground for the ID line, permits the slave processor having two (2) lower order address bits to sense its own ID and be awarded priority.

A detailed block diagram of the circuitry used by each of the slave processors to request access to the bus, and after sensing their own address on the bus, seizing access to the bus is shown in FIG. 3.

Referring now to FIG. 3, the back plane bus is shown to comprise the ID bus 17 shared by the other two slave processors. This ID two bit bus is driven by a bus driver 30 which receives from a three bit register 31 the address supplied by the processor contained within the slave unit. When the microprocessor of the slave unit requests access to the back plane bus for transmission of data over the data lines of the bus, the three bit register 31 is set with the address for the slave processor. An enable bit, additional to the two bit address, shown in FIG. 2 as IDEN*, enables the driver 30 to present the slave address to the two bit ID bus 17.

The logic circuit 32 receives the two bit address, applied by the register 31, as well as the bits sensed on the ID bus 17. The sensed bits are conveyed via a driver 33 to the logic circuit 32. Logic circuit 32 will issue an IACKOUT* when the logic circuit 32 determines that the sensed ID is equivalent to the ID contained within the three bit register 31, and an IACKIN* is received from the master processor.

The VME interrupt handler 34 is a conventional VME controller existing on the slave unit. The interrupt handler 34 will, in response to the IACKOUT*, and the appropriate interrupt level asserted by the master on data bus line A[1:3] 19, will vector the contents of data register 35, such that the data register 35 drives D(7:0) with the data it wishes to send to the master. Thus, it can be seen that the original VME processor units, acting as a master and slave, can be configured such that slave units can independently arbitrate for access to the back plane bus. The independent arbitration scheme permits each of the units to operate independently, such that removal of one slave unit will not interfere with the others acquiring access to the data bus.

Thus, there is described with regard to one embodiment, a system for interconnecting slave units on a VME bus structure such that each unit may, without assistance from an adjacent unit, arbitrate and gain access to a VME bus for data transmission. Those skilled in the art will recognize yet other embodiments described by the claims which follow.

What is claimed is:

1. A system for interconnecting a plurality of salve processors to a master processor over a VME bus structure, permitting data transfers over data lines and address lines of said bus structure, comprising:
    a first group of said slave processors connected to a first common interrupt bus, and an IACK bus of said VME bus structure, and to a first common ID bus;
    a second group of said slave processors interconnected to a second common interrupt bus, and to said IACK bus of said VME bus structure, and connected to a second common ID bus; and,
    a master processor connected to said first and second common interrupt buses of said VME buses, responsive to at least two interrupt levels, said master processor initiating an ACKNOWLEDGE to one of said groups of slave processors over said IACK bus which initiates an INTERRUPT, authorizing said one group to permit one of a respective slave processors access to said VME bus data lines.

2. The system of claim 1 wherein slave processors of a group each include means for asserting their respective addresses on said first common ID bus when access to said VME bus is desired, and means for determining from the address data on said ID bus whether or not priority over other slave processors asserting an address on said bus exits.

3. The system of claim 2 wherein each of said processors contending for access to said VME bus includes means for detecting its own address on a respective ID bus, the presence of which identifies that said slave has priority access to said VME bus.

4. The system of claim 3 wherein said slave processors are arranged in priority by assigning addresses to higher priority slave processors which can over-write an address of a lesser priority slave processor when both are simultaneously applied to said ID bus.

5. The system of claim 1 wherein each group of said slave processors has a unique interrupt level which can be handled by said master processor.

6. A method for interconnecting a plurality of slave processors over a VME back plane with a master processor comprising:
    connecting a first group of said slave processors to a first common interrupt bus, and an IACK bus of said back plane and to a first ID bus;
    sensing at a master processor an interrupt level unique to one of said groups asserted by one or more slave processors of one of said groups of slave processors on a respective interrupt bus;
    initiating from said master processor encoded IACK data on said IACK bus identifying that said one group of slave processors which initiated said interrupt level may initiate a data transfer over said back plane; and,
    arbitrating among said slave processors of said group to permit one of said slave processors to initiate data transmission over said VME back plane.

7. The method of interconnecting a plurality of slave processors over a VME back plane with a master processor according to claim 6 wherein said step of arbitrating among said slave processors comprises:
    asserting an address of each slave processor which contends for access to said back plane on a respective ID bus;
    sensing the address on said respective ID bus by each contending slave processor and,
    each contending slave processor yielding priority to a slave processor whose address overwrites any other address on said ID bus.

8. The method of claim 7 wherein each slave processor contending for access to said VME back plane simultaneously asserts its address on said ID bus while sensing said ID data bus lines, and transmits said data over said back plane when the slave processor senses its own address.

9. In a system of a group of slave processors interconnected over a VME back plane to a master processor, an arbitration circuit for each of said slave processors comprising:

an interrupt generator at each slave processor for generating an interrupt level on an interrupt line connecting said slave processors to a master processor;

an address driver at each slave processor for asserting a unique address associated with said slave processor on an ID bus;

means at each slave processor for sensing an address on said ID bus;

a comparator at each slave processor for detecting the simultaneous occurrence of an interrupt acknowledge signal issued by a master processor in response to said interrupt level, with the presence of said unique address on said ID bus; and, means for enabling a data transmission from a slave processor when a respective comparator identifies the presence of said slave processor address on said bus and the presence of said interrupt acknowledge signal.

10. The system of claim 9 wherein said slave processor shares with second a group of slave processors, a common ID bus, interrupt acknowledge bus, and interrupt line.

11. The system of claim 9 wherein a slave processor has a priority among other slave processors depending on its ability to overwrite the address of said other slave processors on said ID bus.

* * * * *